United States Patent [19]
Bertorello

[11] 3,814,450
[45] June 4, 1974

[54] SELF-CENTERING CHUCK
[75] Inventor: Mario Bertorello, Turin, Italy
[73] Assignee: Rotomors S.R.L., Turin, Italy
[22] Filed: Dec. 6, 1972
[21] Appl. No.: 312,539

[30] Foreign Application Priority Data
Jan. 19, 1972 Italy ................................ 67162/72

[52] U.S. Cl. ................................. 279/4, 279/116
[51] Int. Cl. .......................................... B23b 31/16
[58] Field of Search .............. 279/4, 116, 121, 114; 82/DIG. 6

[56] References Cited
UNITED STATES PATENTS
2,786,689  3/1957  Kalenian ............................ 279/116
3,765,691  10/1973  Saruhashi ........................ 279/116 X Primary Examiner—Gil Weidenfeld
Attorney, Agent, or Firm—Sughrue, Rothwell, Mion, Zinn & Macpeak

[57] ABSTRACT

A self centering chuck of the type having radially sliadable jaws with rearwardly directed inclined teeth engaging in a spiral channel which has correspondingly inclined sides formed in the front face of an axially slidable annular disc within the body of the chuck. Axial displacement of the annular disc thus causes the jaws to make short clamping or release movements due to the inclination of the teeth and the sides of the spiral channel. The radial position of the jaws can also be adjusted by rotating the annular disc, and for this purpose it is linked to a crown wheel which engages a transverse bevel wheel the end of the axis of which lies flush with the surface of the chuck body and has a recess for engagement with a suitable tool. The bevel wheel is provided with means for clamping it against rotation once manual adjustment of the position of the jaws has been effected. The chuck body incorporates a fluid pressure cylinder linked to the annular disc, and the chuck body has openings for communication with correspondingly located openings of pressure fluid conduits in a machine tool on which the chuck is mounted.

6 Claims, 6 Drawing Figures

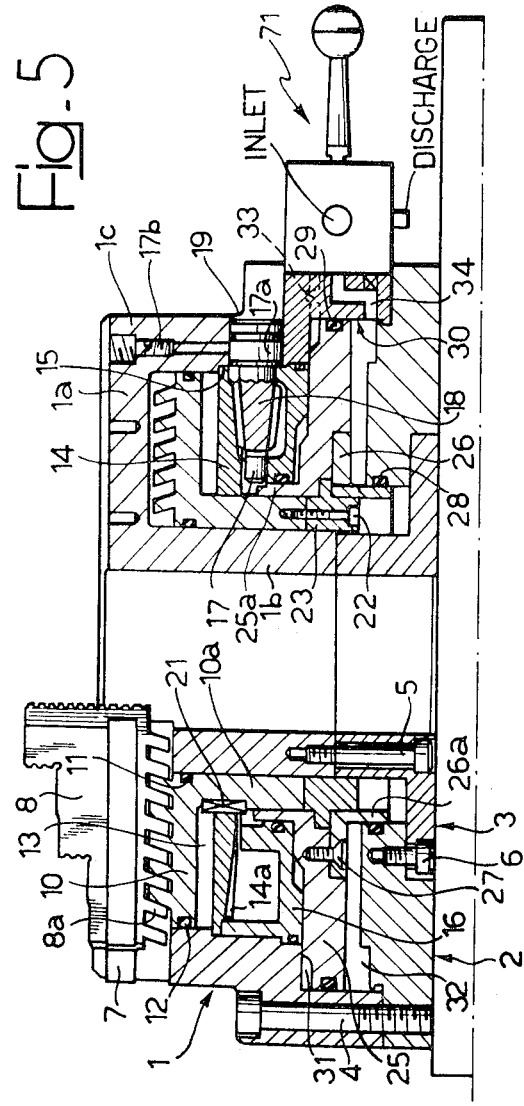

3,814,450

SELF-CENTERING CHUCK

BACKGROUND OF THE INVENTION

One known self-centering chuck for a machine tool has a plurality of locking jaws which are mounted movably in radial channels in a front face of the body of the chuck and are coupled with a spiral channel in one face of an annular disc mounted rotatably within the body of the chuck. The annular disc is locked to a crown wheel which engages at least one bevel wheel the end of the axis of which lies flush with the periphery of the body of the chuck and the shape of which is such as to render possible its engagement by an operating key.

Within the body of the chuck there is mounted an axially movable boss which can be connected by means of a draw-rod to a reversible fluid pressure motor operation of which can effect axial displacement of the boss. Such displacement of the boss is converted into radial displacement, of reduced magnitude, of the jaws. The lateral walls of the spiral channel in the face of the annular disc, and the sides of the teeth of the jaws which enter the said channels, are inclined in the direction of the axis of the chuck so as to control the direction of movement of the jaws during axial displacement of the control boss inside the body of the chuck. The annular disc is connected to the boss so as to be rotatable therewith, but is fixed axially for movement with the boss and, moreover, is connected to the crown wheel in such a way as to be able to effect only axial displacements with respect thereto, that is it is locked for rotation therewith.

OBJECTS OF THE INVENTION

The object of the present invention is to provide a self centering arrangement which is an improvement on the known self-centering arrangements described above.

SUMMARY OF THE INVENTION

According to the present invention, in a self-centering chuck of the type described above there is provided the improvement wherein there are provided locking means for locking against rotation said bevel wheel in engagement with said crown wheel, rotation of which effects rotation of said annular disc having said spiral channels in which engage said rearwardly facing teeth of said jaws, and rotation of which effects adjustment of the position of said jaws with respect to said axis of said chuck body. Preferably said locking means comprise a screw located in a threaded aperture, and which extends from said front face of said chuck body to said bevel wheel, said bevel wheel having a pivot shaft, the end of said locking screw engaging against said pivot shaft of said bevel wheel in said locked position.

In one embodiment said chuck body incorporates a fluid pressure control cylinder, means interconnecting said fluid pressure control cylinder and said annular disc whereby the operation of said control cylinder controls axial movement of said annular disc to effect said short clamping or release movement of said jaws. In such an embodiment said chuck body incorporating said fluid pressure control cylinder is adapted for direct mounting on a spindle of a lathe of a type in which pressure fluid is supplied by ducts in said spindle to a flange at the end of said spindle, which flange also supports said chuck.

In an alternative embodiment said chuck body incorporating said fluid pressure control cylinder is adapted to be mounted on the table of a machine tool of the type in which a fixed workpiece is worked by means of rotating tools, said chuck body being provided with a base for fixing it to said table of said machine tool. In either of the two above mentioned embodiments said chuck body may be provided with a control device controlling the flow of pressure fluid to and from said fluid pressure control cylinder of said chuck body to control opening and closing of said jaws.

Other characteristics and advantages of this invention will become apparent during the following description with reference to the accompanying drawings, which is given purely by way of non-restrictive example.

BRIEF DESCRIPTION OF THE DRAWINGS

FIG. 4 is a diagram of an arrangement for control of the self-centering chuck of FIGS. 1 to 3; and FIGS. 5 and 6 are respectively an axial section and a plan view of an alternative self-centering chuck according to a variation of the invention.

DESCRIPTION OF THE PREFERRED EMBODIMENTS

Figure 1:
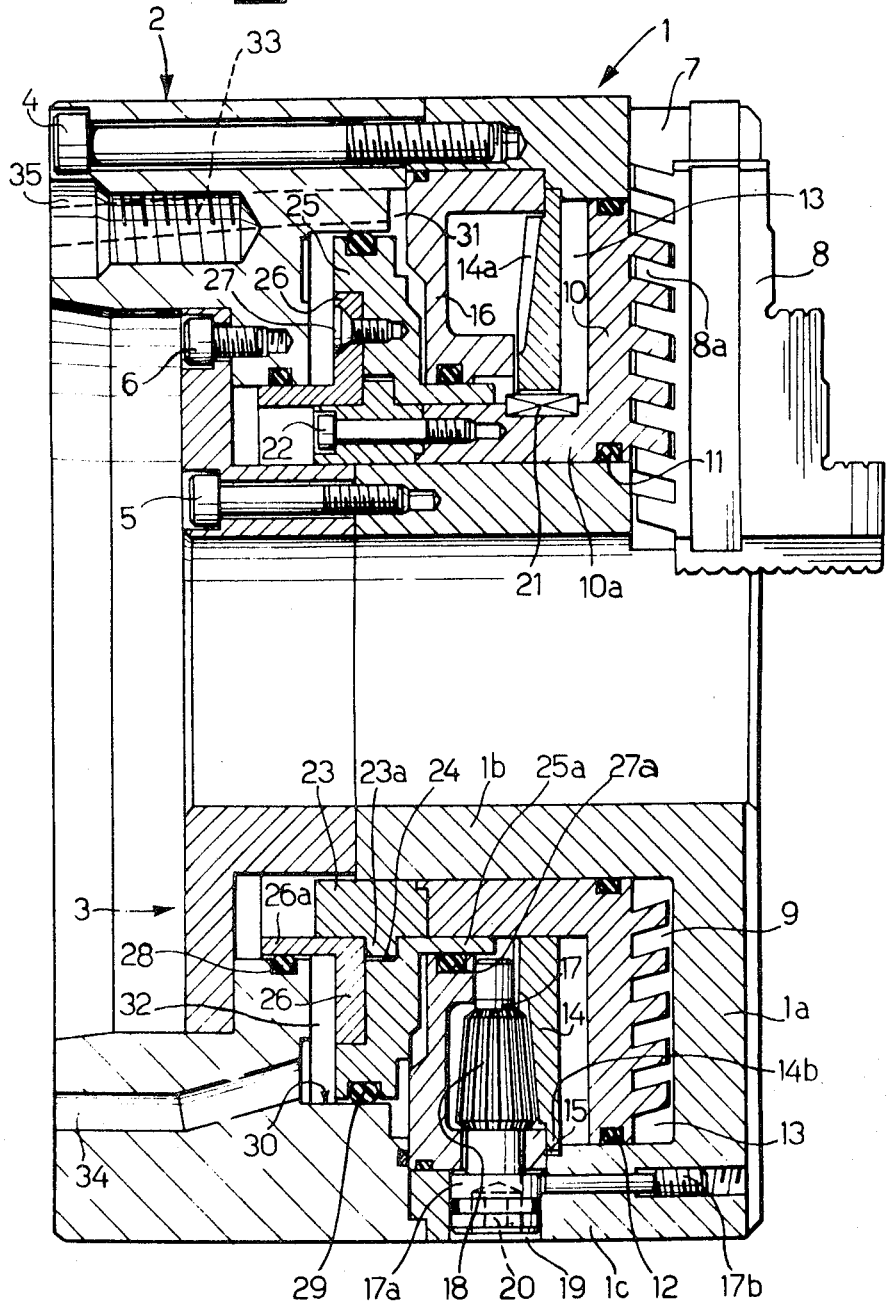
FIG. 1 is an axial section of a self-centering chuck according to this invention, taken on the line I—I of FIG. 2.

In all the drawings corresponding elements have been given the same reference numerals.

Figure 2:
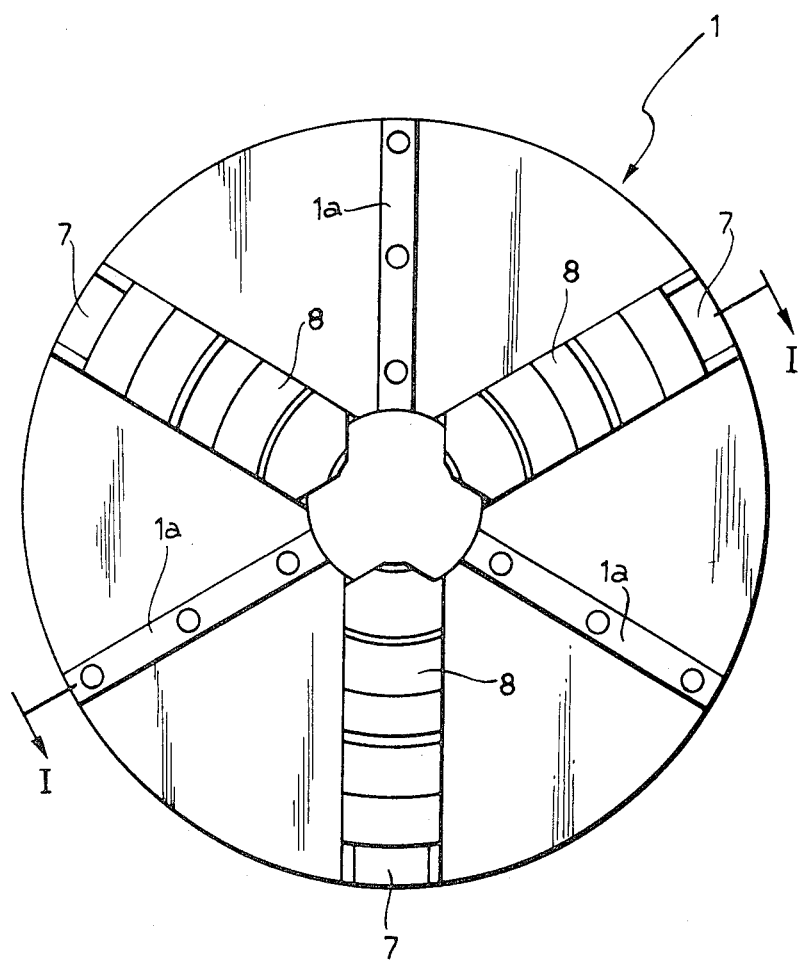
FIG. 2 is a front view of the self-centering chuck illustrated in FIG. 1.
Figure 3:
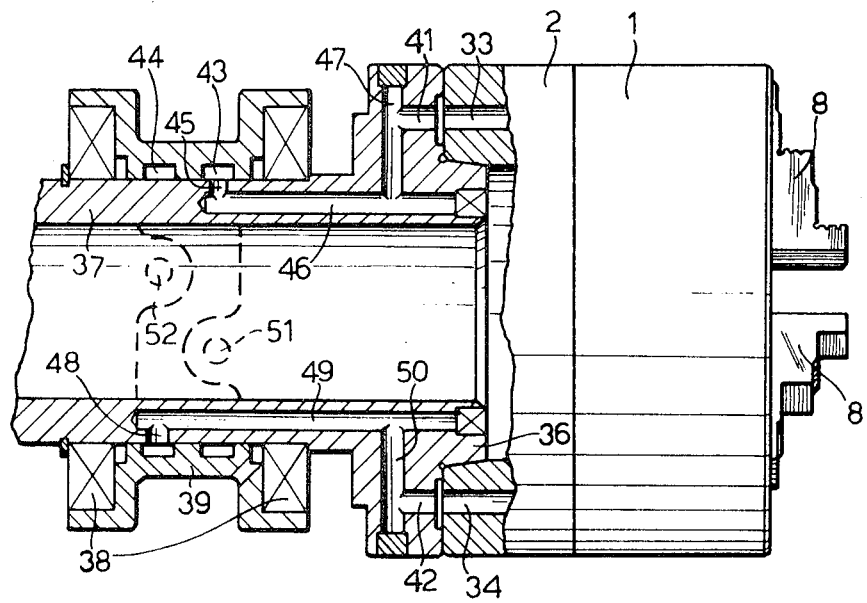
FIG. 3 is a partial axial section showing the self-centering chuck of FIGS. 1 and 2 mounted on a spindle of a machine tool.

The self-centering chuck shown in FIGS. 1 to 3, comprises a body having three annular elements, a front annular element 1, a rear annular element 2, and an intermediate annular element 3. The front element 1 is joined to the rear element 2 by several screws 4 one only of which can be seen in FIG. 1. The intermediate annular element 3 is joined to the front annular element 1 by screws 5 and to the rear annular element 2 by screws 6 which are arranged, in a similar manner to the screws 4, at equal intervals around the axis of the chuck. The front annular element 1 has a front face 1a in the form of an annular disc, which also constitutes the front face of the chuck. In the front face 1a of the front element 1 there are formed three radial channels 7 which are arranged at intervals of 120° and in which respective jaws 8 are movably mounted.

The jaws 8 are provided on their inner faces with a plurality of projections 8a which enter into the flights of a spiral channel 9 in the face of a radial flange 10 of an element having a tubular boss 10a. The flange 10 movably mounted in an annular space 13 formed between an internal boss 1b extending axially inwardly from the front annular element 1 and an external axial flange 1c on the front annular element 1. The tubular axial boss 10a encircles the boss 1b and extends towards the intermediate annular element 3 of the chuck. The tubular boss 10a is surrounded, at a short distance from the flange 10, by an annular disc 14 provided with conical lateral teeth 14a. The disc 14 has a peripheral part 14b which is thinner than the remainder of the disc and is mounted rotatably in a channel formed between a stepped recess 15 in the internal face of the axial flange 1c of the first annular element 1 and an annular support 16 which is locked between the annular elements 1 and 2 of the chuck by means of the screws 4.

In the support 16 there is rotatably mounted a pivot 17 of a pinion 18 in engagement with the teeth 14a of the disc 14. The pivot 17 has a head 17a located in a radial aperture 19 in the external flange 1c of the front annular element 1 of the chuck. The head 17a has a recess 20 the transverse section of which is polygonal and which is accessible from the outside of the chuck via an opening 19, so that it can be engaged by a key by means of which rotation of the bevel pinion 18 and thus of the disc 14 can be effected manually.

A screw 17b located in a threaded aperture, extending between the front face 1a of the element 1 and the aperture 19, serves to lock the pinion 18 against rotation, once the manual adjustment of the radial position of the jaws 8 has been effected. This makes it possible to prevent unwanted, and uncontrolled, movements of the jaws when the spindle is working automatically, in which case the movements of the jaws necessary for locking and releasing the work pieces, are controlled only by axial displacements of the annular disc 10.

The disc 14 is connected to the tubular boss 10a by means of a key 21 in such a way that this boss, and with it the flange 10, can move axially but cannot rotate with respect to the disc 14. To the tubular boss 10a there is connected a boss 23 by means of screws 22. The boss 23 is formed with a small external flange or collar 23a. The flange 23a is housed in a channel 24 formed between the two parts 25 and 26 of a piston which is movable in an annular space formed between the rear annular element 2 of the body of the chuck, and the support 16. The parts 25 and 26 of the piston are connected together by screws 27 and have internal tubular projections 25a and 26a respectively, which can slide along the internal cylindrical surface of the parts 2 and 16, and which have respective sealing rings 27a and 28.

The external periphery of the radial flange of the part 25 of the piston is slidable along an inner cylindrical surface 30 of the rear annular element 2. The piston comprising the parts 25 and 26 and the respective tubular projections 25a and 26a, together with the elements 2 and 16, define two chambers 31 and 32 respectively. These chambers are connected, by conduits 33 and 34 respectively, formed in the rear annular element 2, to a distributor valve (not illustrated in FIGS. 1 and 2) for distributing fluid under pressure into the chamber 31 or the chamber 32 according as to whether it is desired to cause the piston to advance towards the annular element 1 or away from the annular element 1.

When the fluid under pressure is supplied through the conduit 33 to the chamber 31, the piston 25, 26 moves in the direction away from the front annular element 1 and draws with it the boss 23, and the cylindrical projection 10a of the flange 10. The effect of this is to cause the spiral 9 to act on the rear teeth 8a of the jaws 8, in a direction such as to cause the jaws to effect a limited movement towards the axis of the chuck to lock a workpiece into position.

By connecting the conduit 33 and the chamber 31 to a discharge opening, and the conduit 34 and the chamber 32 to the source (not shown in FIGS. 1 and 2) of fluid under pressure, the piston 25, 26 and thus the flange 10 will be moved in the opposite direction, that is towards the front annular element 1, thus causing limited movement of the jaws 8 away from the axis of the chuck.

The embodiment described is suitable for mounting on the flange of the spindle of a machine tool of the type in which the spindle is formed with conduits for supplying oil under pressure, the outlets of which are formed in the end of the spindle and which may be aligned with the inlets of the conduits 33 and 34. The chuck may be fixed at the end of the spindle by screws engageable in threaded openings 35 in the rear face of the rear annular element 2 of the body of the chuck.

An example of this arrangement of the chuck fixed to a machine tool is shown in FIG. 3. The self-centering chuck 1, 2 is mounted on the "flange" 36 of a hollow spindle 37 which is rotatably mounted on bearings 38 carried in a hollow support body 39 in the carriage (not shown) of a machine tool, for example a lathe. The self-centering chuck is fixed in the manner described above to the flange 36 of the spindle, and is orientated so that the conduits 33, 34 each communicate with one of two axial passageways 41 and 42 in the front face of the flange 36.

In the cylindrical inner surface of the hollow body 39 which supports the bearings 38 there are two identical annular channels 43 and 44 axially spaced from one another by a short distance. The channel 43 communicates with the passageway 41 by means of a radial passageway 45 and an axial passageway 46 in the spindle 37, and by a radial passageway 47 in the flange 36. The channel 44 communicates with the passageway 34 via a radial conduit 48 and an axial conduit 49 in the spindle, and a radial conduit 50 in the flange, these being similar to the passageways 45, 46, and 47 which connect the channel 43 to the conduit 41.

The channels 43 and 44 also communicate with the outside through openings 51 and 52 in the wall of the support body 39 and indicated in FIG. 3 in broken outline.

Control of the opening and closing movement of the jaws 8 may be effected by means of a control circuit such as that diagrammatically illustrated in FIG. 4. This circuit comprises an oil reservoir 53 in which there are located a pump 54 and an electric motor 55. The pump 54, when operating, supplies oil under pressure to a changeover valve 56 which is actuated by electromagnets 57 and 58.

The valve 56 is connected to a manually actuated auxiliary change-over valve 59 by a conduit 60, and also via a conduit 62 and a unidirectional valve 61 in parallel with the conduit 60. The conduit 62 which connects the valve 61 to the valve 59 communicates with a pressure accumulator 63. A regulable pressure reducer 64, and a monometer 65, which can be isolated by means of a cock 66 are connected between the reservoir 53 and the valve 56 to the conduit connected to the pump 54.

Two conduits 67 and 68 from the valve 59 are connected to the openings 51 and 52 respectively, and thus communicate with the channels 43 and 44 of the support body 39. When the valves 56 and 59 are in the positions illustrated on the right hand side thereof in FIG. 4 oil is supplied under pressure to the chamber 31 of the self-centering chuck (see FIG. 1) and thus clamping movement of the jaws towards the axis of the chuck, is effected. Should the motor 55 (see FIG. 4) fail in any way, so that the pump ceases to produce oil under pressure, the retaining valve 61 will prevent a sudden drop in pressure in the chamber 31, which would allow the jaws to relax their clamping force, and the pressure will be maintained for a certain time by the accumulator 63. Other particulars of the operation of the system described above will not be discussed, since they will be apparent to those skilled in the art.

Figure 6:
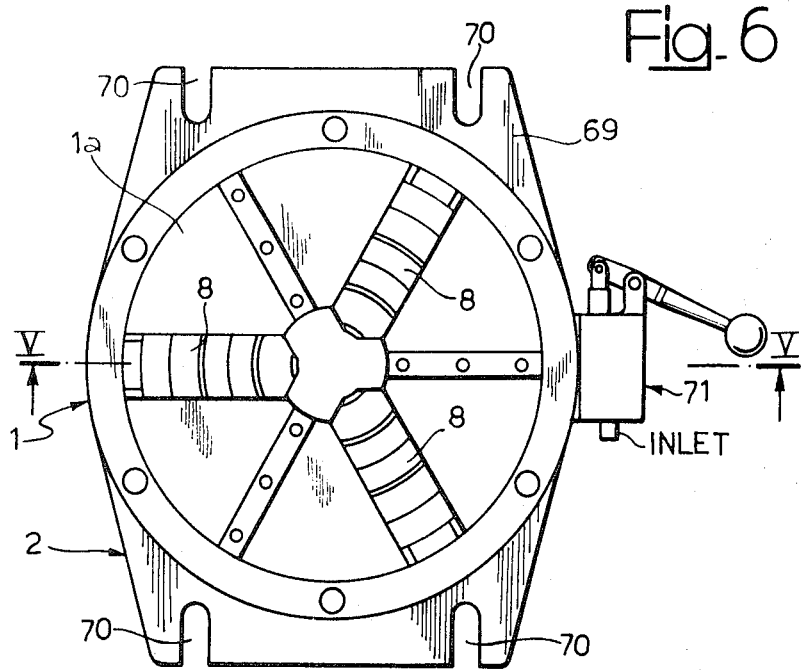

If the self-centering chuck is to be mounted on a table of a machine tool, such as a drilling machine, a reamer, or a nut-tapping machine, for example, in which a fixed workpiece is worked with rotating tools, the rear annular element 2 of the body of the chuck can be adapted at its rear face, that is the face remote from the jaws 8, to form a base 69 (see FIGS. 5 and 6) provided with apertures 70 through which fixing bolts (not shown) can be passed to connect the base 69 to the workpiece table (not shown) of a machine tool. In this case the driving piston is operated preferably pneumatically, by a control device constituted by a manually operated four-way distributor 71, or by an electromagnet (not shown) arranged directly on the body of the chuck. In the case of pneumatic operation the operating faces of the piston 25, 26 are suitably enlarged in view of the lower pressure, about 6 atmospheres, which can be applied by compressed air as compared with a pressure of between 13 to 25 atmospheres which can be applied in the case of hydraulic operation.

It will be appreciated that the hydraulic control arrangement of FIG. 4 could alternatively be used to control a fixed chuck on a workpiece table of a machine tool, and conversely, the simple distributor 70 could be used to control the chuck when mounted on a spindle as illustrated in FIGS. 1 to 3.

I claim:

1. In a self centering chuck of the type comprising:

a chuck body,
   radial channels on the front face of said chuck body, jaws slidably mounted in said radial channels of said front face of said chuck body,
   rearwardly facing inclined teeth on said jaws,
   an annular disc mounted within said chuck body, the front face of said annular disc having a spiral channel therein, the sides of said spiral channel being inclined with respect to the axis of said chuck body, said rearwardly directed teeth in said jaws engaging in said spiral channel, a crown wheel mounted within said chuck body,
   means interconnecting said crown wheel and said annular disc such that said annular disc is coupled to said crown wheel for rotation therewith and is axially movable with respect to said crown wheel to cause short clamping or unclamping movements of said jaws,
   a bevel wheel mounted in said chuck body in driving engagement with said crown wheel, the axis of said bevel wheel extending transverse to the axis of said crown wheel and one end of said bevel wheel having tool engagement means being accessible for manual rotation with a suitable tool to cause rotation of said crown wheel to adjust the position of said jaws with respect to the axis of said chuck body, and locking means for locking said bevel wheel against rotation after manual adjustment thereof to prevent undesirable movement of said jaws.

2. The chuck of claim 1, wherein said locking means comprise a screw located in a threaded aperture, and which extends from said front face of said chuck body to said bevel wheel,
   said bevel wheel having a pivot shaft,
   the end of said locking screw engaging against said pivot shaft of said bevel wheel in said locked position.

3. The chuck of claim 1 wherein said chuck body incorporates a fluid pressure control cylinder,
   means interconnecting said fluid pressure control cylinder and said annular disc whereby the operation of said control cylinder controls axial movement of said annular disc to effect said short clamping or unclamping movements of said jaws.

4. The chuck of claim 3 wherein said chuck body includes means for being supported on the end portion of a spindle having a flange thereat, and said spindle and flange having interconnecting fluid passageways communicating with fluid passageways in said chuck body for providing fluid pressure to said control cylinder.

5. The chuck of claim 3 wherein said chuck body includes a base adapted to be mounted on the table of a machine tool.

6. The chuck of claim 5 wherein said chuck body carries means for controlling the flow of pressure fluid to and from said fluid pressure control cylinder of said chuck body to control opening and closing of said jaws.

* * * * *